United States Patent
Hagendorf

(10) Patent No.: US 8,145,770 B2
(45) Date of Patent: Mar. 27, 2012

(54) DEVICES, METHODS, AND MEDIA FOR DETERMINING AND ASSIGNING OPTIMAL MEDIA CHARACTERISTICS IN COMMUNICATIONS SESSIONS

(75) Inventor: Pierre Hagendorf, Raanana (IL)

(73) Assignee: Radvision Ltd., Tel Aviv (IL)

( * ) Notice: Subject to any disclaimer, the term of this patent is extended or adjusted under 35 U.S.C. 154(b) by 167 days.

(21) Appl. No.: 12/262,351

(22) Filed: Oct. 31, 2008

(65) Prior Publication Data

US 2010/0115094 A1     May 6, 2010

(51) Int. Cl.
*G06F 15/16* (2006.01)
*G06F 15/173* (2006.01)

(52) U.S. Cl. .......... 709/228; 709/223; 709/227
(58) Field of Classification Search .......... 709/223–229; 340/825
See application file for complete search history.

(56) References Cited

U.S. PATENT DOCUMENTS

| 5,968,132 | A  | * | 10/1999 | Tokunaga et al. | 709/247 |
| 6,529,475 | B1 | * | 3/2003  | Wan et al.      | 370/231 |
| 7,116,682 | B1 | * | 10/2006 | Waclawsky et al.| 370/468 |

* cited by examiner

*Primary Examiner* — Yemane Mesfin
*Assistant Examiner* — Carlos Perez
(74) *Attorney, Agent, or Firm* — Byrne Poh LLP

(57) ABSTRACT

Devices, methods, and media for determining and assigning optimal media characteristics in communications sessions are provided.

32 Claims, 4 Drawing Sheets

FIG. 2

DEVICES, METHODS, AND MEDIA FOR DETERMINING AND ASSIGNING OPTIMAL MEDIA CHARACTERISTICS IN COMMUNICATIONS SESSIONS

FIELD OF THE INVENTION

The present invention relates to the field of telecommunications. More particularly, the present invention relates to devices, methods, and media for determining and assigning optimal media characteristics in communications sessions.

BACKGROUND OF THE INVENTION

Communications systems, such as Voice over Internet Protocol (VoIP) networks, real-time streaming multimedia networks, and other real-time IP communications networks, have become widely used for varying purposes ranging from transmitting media for entertainment to transmitting media for videoconferencing. In these systems, bandwidth resources are reserved based on statistical models that anticipate a given amount of concurrent streams, calls, or sessions. For example, the administrator or operator generally chooses a set of bandwidths to be used during calls, and each endpoint joining is automatically assigned a bandwidth for the duration of the call.

Such communications systems, however, often fail when the capacity needed to serve the customers that wish to use their subscribed services is not available. These communications systems attempt a number of approaches to ensure a particular quality of service (QoS). For example, when a customer on a VoIP communications system attempts to setup a new call and there is not enough bandwidth available, the VoIP communications system typically refuses to setup a call when the available bandwidth limit has been reached. Alternatively, some VoIP communications systems reduce the call quality of existing streams, calls, or sessions (e.g., using a different encoding technique) that are utilizing the available bandwidth resources, thereby freeing up enough bandwidth resources to allow the additional call to be placed. The mechanisms used to perform this functionality are raw and underdeveloped, and do not allow the service provider to provide an optimal service to its customers. As a result, these approaches often fail to meet the QoS guarantees given by service providers and often cause these service providers to reimburse their customers for failing to meet a particular level of service.

There is therefore a need in the art for approaches that determine and assign optimal media characteristics within a constrained communications resource. Accordingly, it is desirable to provide devices, methods, and media that overcome these and other deficiencies of the prior art.

SUMMARY OF THE INVENTION

Devices, methods, and media for determining and assigning optimal media characteristics in communications sessions are provided. In some embodiments, these methods comprise: managing one or more sessions between a plurality of communications devices on a communications channel, wherein media characteristics are associated with each session, the media characteristics comprising at least one of: a codec, a bitrate, a resolution, a maximum granularity (e.g., quantization factor used for the encoding) for video streams, a sampling rate for audio streams, a frame rate, and a packet size, and wherein each session has original media characteristics; detecting at least one of: a change in one of the sessions on the communications channel, an addition of an additional session on the communications channel, a removal of one of the sessions from the communications channel, a change in capabilities of one of the sessions on the communications channel, a change in capabilities of the communications channel, and a change in capabilities of one of the plurality of communications devices; in response to the detection, optimizing the media characteristics to be used by the one or more sessions on the communications channel, wherein the optimizing comprises: creating a plurality of media characteristic combinations from every possible combination of media characteristics associated with each session; for each of the plurality of media characteristic combinations, calculating a Quality Drop Coefficient (QDC) for each session that uses the communications channel, wherein the QDC is computed based at least in part on the original media characteristics associated with the session and the suggested media characteristic to apply in response to the detection; and calculating a Quality Drop Value (QDV) for each of the plurality of media characteristic combinations, wherein the media characteristic combination having the lowest QDV is designated as an optimal media characteristic set; and setting the media characteristics associated with each session on the communications channel to the optimal media characteristics set.

In some embodiments, devices for determining and assigning optimal media characteristics in communications sessions are provided. The devices comprising a processor that is configured to: manage one or more sessions between a plurality of communications devices on a communications channel, wherein media characteristics are associated with each session, the media characteristics comprising at least one of: a codec, a bitrate, a resolution, a maximum granularity (e.g., quantization factor used for the encoding) for video streams, a sampling rate for audio streams, a frame rate, and a packet size, and wherein each session has original media characteristics; detect at least one of: a change in one of the sessions on the communications channel, an addition of an additional session on the communications channel, a removal of one of the sessions from the communications channel, a change in capabilities of one of the sessions on the communications channel, a change in capabilities of the communications channel, and a change in capabilities of one of the plurality of communications devices; in response to the detection, optimize the media characteristics to be used by the one or more sessions on the communications channel, wherein the processor is further configured to: create a plurality of media characteristic combinations from every possible combination of media characteristics associated with each session; for each of the plurality of media characteristic combinations, calculate a Quality Drop Coefficient (QDC) for each session that uses the communications channel, wherein the QDC is computed based at least in part on the original media characteristics associated with the session and the suggested media characteristic to apply in response to the detection; and calculate a Quality Drop Value (QDV) for each of the plurality of media characteristic combinations, wherein the media characteristic combination having the lowest QDV is designated as an optimal media characteristic set; and set the media characteristics associated with each session on the communications channel to the optimal media characteristics set.

In some embodiments, computer-readable media containing computer-executable instructions that, when executed by a processor, cause the processor to perform a method for determining and assigning optimal media characteristics in communications sessions are provided. In some embodiments, the method comprises: managing one or more sessions between a plurality of communications devices on a communications channel, wherein media characteristics are associated with each session, the media characteristics comprising at least one of: a codec, a bitrate, a resolution, a maximum granularity (e.g., quantization factor used for the encoding) for video streams, a sampling rate for audio streams, a frame rate, and a packet size, and wherein each session has original media characteristics; detecting at least one of a change in one of the sessions on the communications channel, an addition of an additional session on the communications channel, a removal of one of the sessions from the communications channel, a change in capabilities of one of the sessions on the communications channel, a change in capabilities of the communications channel, and a change in capabilities of one of the plurality of communications devices; in response to the detection, optimizing the media characteristics to be used by the one or more sessions on the communications channel, wherein the optimizing comprises: creating a plurality of media characteristic combinations from every possible combination of media characteristics associated with each session; for each of the plurality of media characteristic combinations, calculating a Quality Drop Coefficient (QDC) for each session that uses the communications channel, wherein the QDC is computed based at least in part on the original media characteristics associated with the session and the suggested media characteristic to apply in response to the detection; and calculating a Quality Drop Value (QDV) for each of the plurality of media characteristic combinations, wherein the media characteristic combination having the lowest QDV is designated as an optimal media characteristic set; and setting the media characteristics associated with each session on the communications channel to the optimal media characteristics set.

BRIEF DESCRIPTION OF THE DRAWINGS

FIG. 2 is an example of a table of quality degradation coefficients in accordance with some embodiments of the present invention.

DETAILED DESCRIPTION OF VARIOUS EMBODIMENTS

Figure 1:
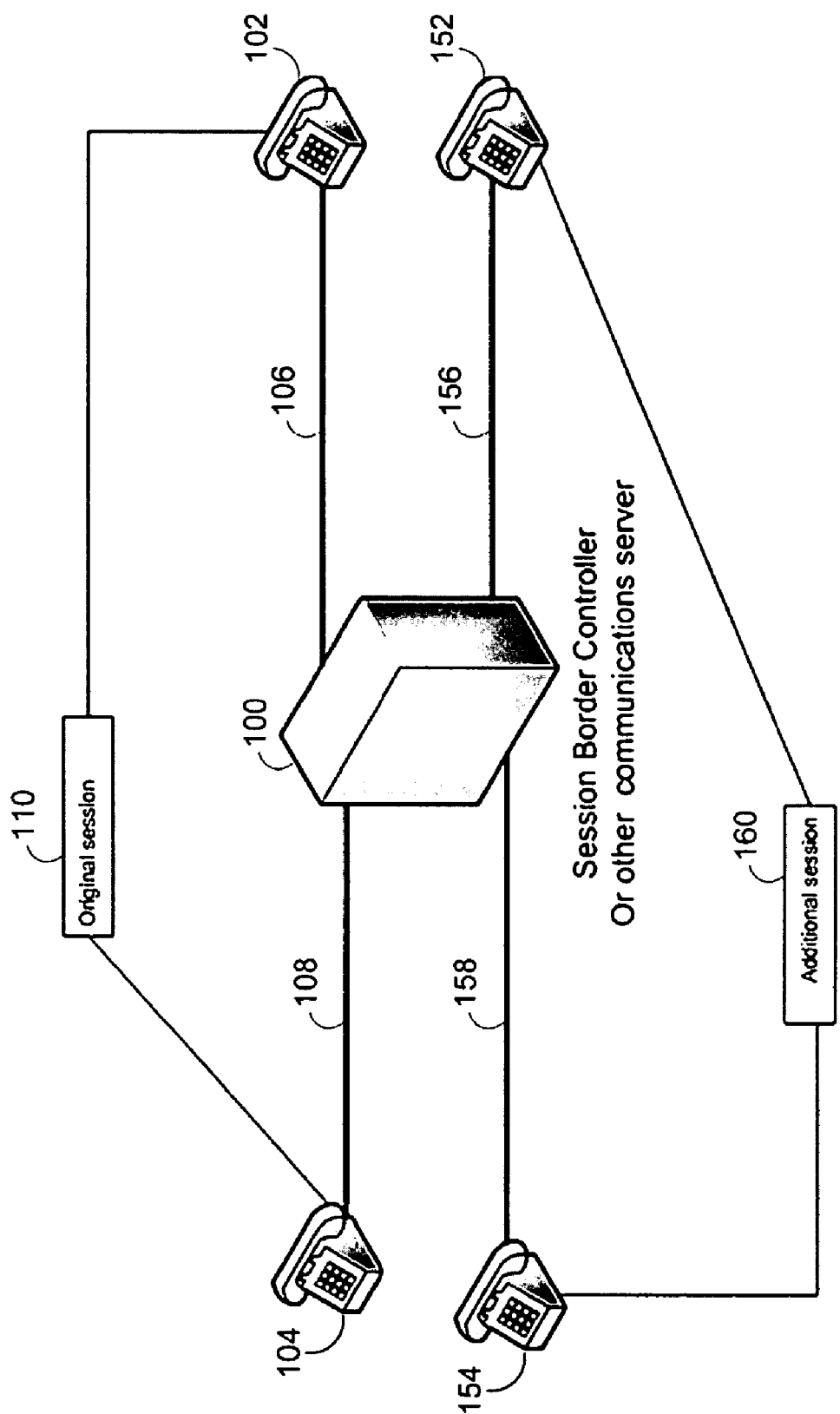
FIG. 1 is a schematic diagram of an illustrative system on which the process for determining and assigning optimal media characteristics may be implemented in accordance with some embodiments of the present invention.

In accordance with some embodiments of the present invention, devices, methods, and media for determining and assigning the optimal media characteristics to use in one or more sessions, where each session has multiple communications devices (e.g., VoIP phones, SIP phones, Skype phones, softphones or software-implemented telephones, POTS phones, multimedia communications devices, communications servers (e.g., voice messaging servers or streaming servers), etc.) participating in that session, on a communications path (e.g., an Internet connection, a Multiprotocol Label Switching (MPLS) connection, an Ethernet network, etc.) are provided.

It will be appreciated that while the discussion of the following embodiments are described as being implemented with real-time IP communications systems, such as VoIP networks, this is merely illustrative. The features of the disclosed subject matter may be implemented on any suitable communications system.

Each communications device has associated media or encoding characteristics (generally referred to herein as "media characteristics"). These media characteristics may include, for example, media bitrate, codec, packet size, voice payload size, frame rate, resolution, granularity (e.g., for video streams, quantization factor used for the encoding, etc.), sampling rate (e.g., for audio streams), and packets per second.

It should be noted that, while each communications device supports particular media characteristics, media characteristics are determined and employed for each session. That is, the media characteristics of a communications session are determined and/or derived based in part on the media characteristics supported by the communications devices at both ends of the session. Accordingly, the determined media characteristics for the communications sessions are applied to the communications devices that participate in the session. Based on the media characteristics employed by each session, a given amount of bandwidth is used on the particular communications channel. Note that a session includes a call, a stream, or any other suitable exchange of data.

For example, in VoIP networks or any other packet-based voice networks, each VoIP communications session uses a particular amount of bandwidth. The particular amount of bandwidth can be calculated and generally depends on the media characteristics of the stream or streams the VoIP phone sends and receives during a particular communications session. In addition, each communications session may be capable of altering or configuring the media characteristics associated with the session. For example, in one VoIP session or call, the session may initially use a G.711 codec that has an associated bitrate of 64 Kbps. However, after the addition of another session or call, all sessions on the channel may use a G.729 codec that has an associated bitrate of 8 Kbps (not including any overhead, such as, for example, headers).

In another example, the number of codec samples per packet is another factor in determining the bandwidth and delay of a VoIP session. It should be noted that, while the codec defines the size of the sample, the total number of samples placed in a packet affects how many packets are sent per second. In addition, the size of each packet and the inherent delay of the transmission of the media over the network (since the transmitting device concatenates packets from several consecutive voice samples before sending the data out to the network) may affect how many packets are sent per second. Accordingly, the packet size and/or payload size associated with one or more sessions may be modified to optimize bandwidth allocation in a communications system (the larger the packets, the lower the amount and size of the headers that accompany the media).

In some embodiments, communications between devices on a communications channel are managed by a controller (e.g., a session border controller). The controller, such as a session border controller, may be used in a communications system to control the signaling and media streams involved in initiating, conducting, and terminating communications sessions on a communications channel. The session border controller may, for example, automatically modify (e.g., transcode, transrate, or perform any suitable transformation on the streams) the media characteristics of the streams that are currently participating in sessions on the communications channel. In another example, the session border controller may transmit commands to each communications device currently participating in sessions on the communications channels, where the commands instruct each communications device which media characteristics to use for the session.

For example, the controller may perform a transcoding process when two or more communications devices or endpoints of a session do not support the same codec. In another example, in order to communicate audio signals in particular VoIP communications system, the controller uses the G.711 signals received from one endpoint and transcodes them to G.723.1 or G.729 compressed audio signals to conserve bandwidth. The compressed audio signals may then be packetized and communicated in streams of packets over the Internet or any other suitable communications path.

Whenever more than one media characteristic set is available in one of the sessions (e.g., all of the communications devices that are participating in the session support multiple media bitrates that are compatible with each other), the controller calculates a Quality Drop Coefficient (QDC) for each possible set of media characteristics of the communications session on the communications channel, and then calculates a Quality Drop Value (QDV) for each such set of media characteristics. In some embodiments, the QDV is a function of each calculated QDC and the number of sessions suffering from each calculated QDC. These calculations determine the optimal media characteristics for the communications sessions on the channel.

It should be noted that, in some embodiments, the QDC and QDV may be calculated and/or recalculated at any suitable time. For example, the QDC and QDV may be recalculated to determine a new set of optimal media characteristics in response to: a) receiving an indication that a communications device has joined one of the sessions on the channel, b) receiving an indication that a communications device has left one of the sessions on the channel, c) adding a session on the communications channel, d) removing a session on the communications channel (e.g., allocating more bandwidth for remaining sessions on the communications channel), e) changing the capabilities of one of the sessions on the communications channel (e.g., enabling a feature in an endpoint affecting its capabilities), f) determining that the actual capabilities of one of the communications devices or one of the sessions are different from the declared capabilities, g) opening an additional channel in an existing session (e.g., upgrading from a voice call to a voice and video call in the middle of the call), etc.

It should be noted that, in some embodiments, another element within the network that may not be affiliated with the communications devices or the controller may be used in the network to transcode, transrate, or perform any other suitable transformation on the original stream to adapt it to an optimal set of media characteristics. For example, a processor, a media gateway, a transcoder, or any other suitable element within the network may modify the original stream to the optimal set of media characteristics.

It should also be noted that one element within the network (e.g., the session border controller) may calculate the QDC and QDV and determine the optimal media characteristics, while another element within the network (e.g., a transcoder) may modify the original stream to conform with the determined optimal media characteristics.

The following figures and their accompanying descriptions provide detailed examples of the implementation of the systems and methods of the present invention.

FIG. 1 is a generalized schematic diagram of a system on which the process for determining and assigning optimal media characteristics may be implemented in accordance with some embodiments of the present invention. As illustrated, the system may include a controller 100. Controller 100 may be a session border controller, a communications server, or any other suitable controller that manages communications channels 106, 108, 156, and 158 (limited to four in the figure for the sake of simplicity). As also shown, two communications devices (102 and 104) are participating in a session 110, communications devices 102 and 104 being dynamically connected to communications channels 106 and 108, respectively.

In response to communications device 102 requesting to initiate a session with communications device 104, communications device 102 sends a setup message to controller 100 that includes the media characteristics that communications device 102 supports. Controller 100 communicates at least a portion of the setup message to communications device 104. Communications device 104 may send a request to controller 100 to receive the call from communications device 102. The request or any other suitable message may include the media characteristics that communications device 104 supports. Controller 100 may determine the media characteristics for the session between communications devices 102 and 104 based at least in part on the media characteristics that each communications device supports. Accordingly, a session 110 is initiated between communications devices 102 and 104.

As shown in FIG. 1, communications devices 152 and 154 can request to initiate an additional session on the communications channels managed by controller 100. When a communications device joins or leaves a session, initiates an additional session, and/or changes capabilities of a session, the media characteristics set ensuring the optimal QDV for the new setting is recalculated. Alternatively, the media characteristics set and its associated QDV may be recalculated in response to adding an additional session on a communications channel, removing one of the sessions on a communications channel, changing the capabilities of one of the sessions, determining the actual capabilities of a communications device are different from the declared capabilities of the communications device, opening an additional channel in an existing session, etc. The new calculation may lead to a decision about a change in one or more media characteristics causing some of the communications devices, in some cases, to be assigned to a new set of media characteristics according to the updated calculation of the optimal QDV for the session.

Figure 2:
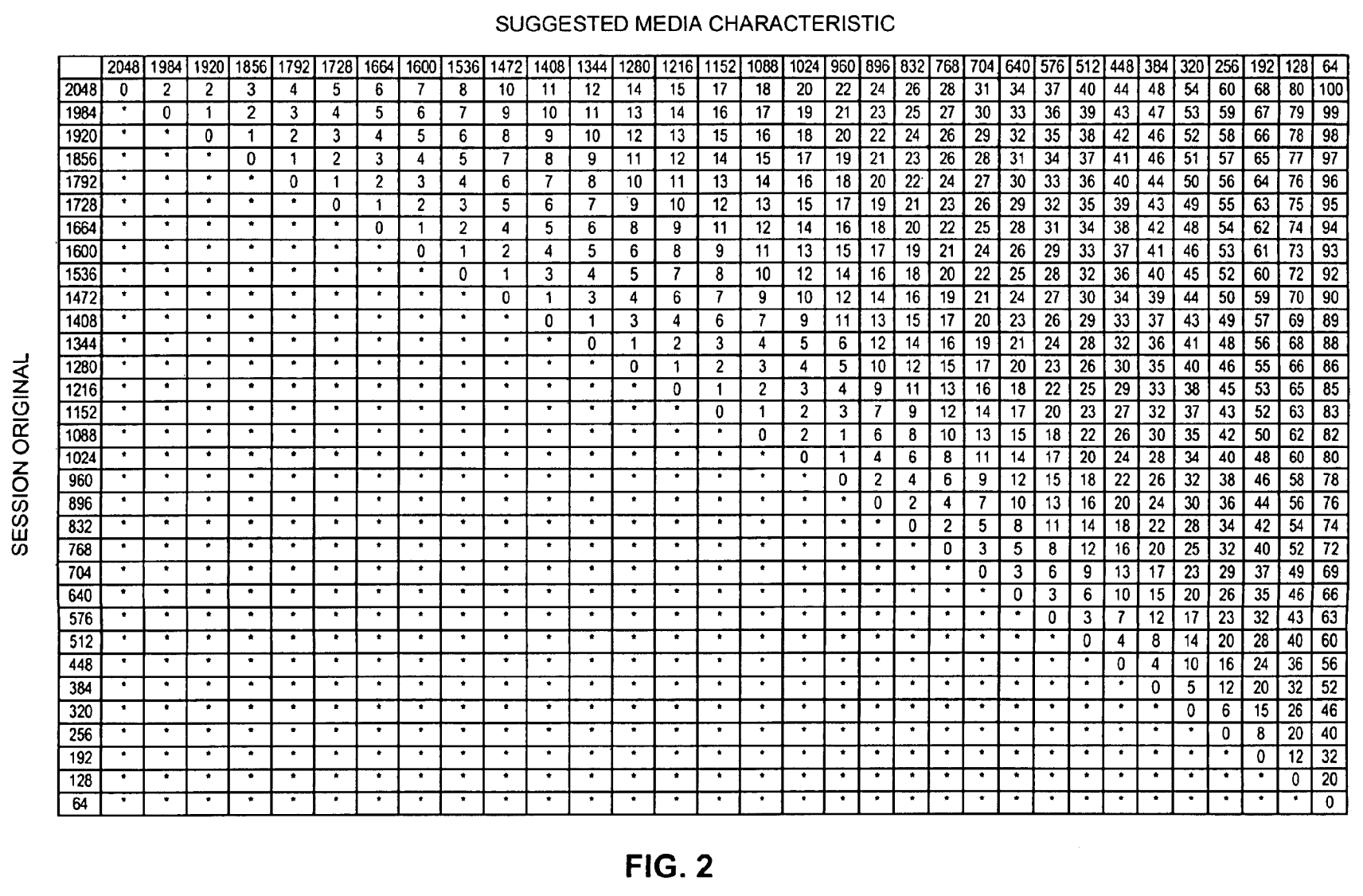

In order to determine which media characteristics to apply on the sessions using the communications channel, a weighted approach (e.g., the calculation of the QDC and QDV) is used. In order to assess the impact of each decision on the media characteristics applied to the communications sessions on the communications channel pursuant to the addition of a new session or any other changes to the communications channel (e.g., removing a session from the channel, changing the capabilities of a session, opening an additional channel in an existing session, changing the capabilities of the channel, etc.), QDC and QDV are dynamically recalculated during the session. As described above, the weight (QDC and QDV) is a combination of the "quality degradation" and the number of sessions suffering this "quality degradation." FIG. 2 is an illustrative example of a table of quality degradation coefficients. As shown, the QDV is computed according to a multi-dimensional table holding the "quality drop coefficients." For each entry media characteristic and suggested media characteristic set, a coefficient will be defined. The vertical axis of the matrix defines the entry media characteristics of the communications session and the horizontal axis of the matrix defines the suggested media characteristics for the communications session. The intersection between the media characteristics from the original (optimal) session and the suggested media characteristics is the QDC for that communications session.

When a change occurs on the communications channel, it activates a module responsible for the calculation of the optimal media characteristics for the sessions on the channel. This module (e.g., a session border controller) determines which media characteristics the sessions should use on the channel.

In accordance with some embodiments of the invention, lowering the bandwidth is not the only parameter that may be altered in response to a change on the communications channel. In some embodiments, if the service is configured accordingly and if the new session supports a lower resolution than the default (optimal) resolution for the session, degradation in resolution is also allowed (resolution mechanism).

It should be noted that other parameters may also be controlled by the session border controller or any other suitable controller. For example, in some embodiments, the codec that is used may be controlled (e.g., whether the audio is stereo or not, etc.).

Figure 3:
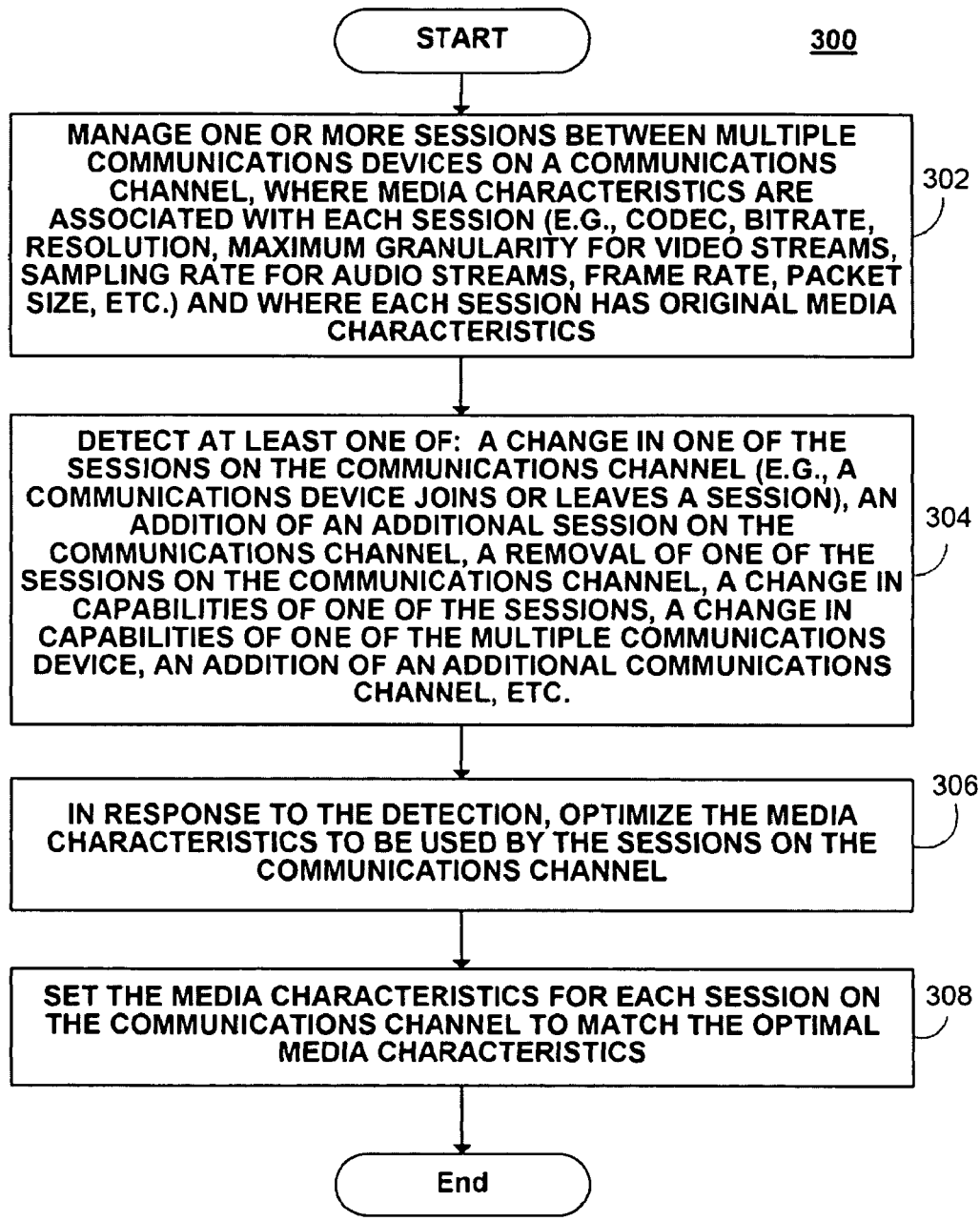
FIGS. 3 and 4 are diagrams of a process that may be used to determine and assign optimal media characteristics in communications sessions in accordance with some embodiments of the present invention.

Turning to FIG. 3, a process 300 that may be used to implement the dynamic bandwidth allocation features of a communications system is illustrated. As shown, beginning at step 302, process 300 may manage one or more sessions on a communications channel, where each session has multiple communications devices participating in the session. For example, in a VoIP network, a session border controller may manage the sessions on the communications channel and the communications devices may be one or more VoIP phones, one or more Session Initiation Protocol (SIP) phones, one or more softphones or software-implemented telephones, etc.

It should be noted that each communications device has media characteristics associated with it. The media characteristics of a communications session are determined and/or derived based in part on the media characteristics supported by the communications devices at both ends of the session. Accordingly, the determined media characteristics for the communications sessions are applied to the communications devices that participate in the session. These media characteristics may include, for example, a media bitrate, a codec, a resolution, a maximum granularity (e.g., for video streams, quantization factor used for the encoding, etc.), a sampling rate (e.g., for audio streams), a frame rate, a packet size, a payload size, and packets per second. In some embodiments, the media types can include voice as well as video.

It should also be noted that a session may include a call, a stream, or any other suitable exchange of data.

At step 304, the session border controller or any other suitable entity that manages the communications channel detects an event on the communications channel and, in response to the detection, optimizes the media characteristics to be used by the sessions on the communications channel at step 306. For example, the controller may calculate the Quality Drop Coefficients and the Quality Drop Values in response to determining that a session was added to the communications channel. In another example, the controller may calculate the Quality Drop Coefficients and the Quality Drop Values in response to determining that a session has been removed from the communications channel (e.g., allocating more bandwidth for sessions that are remaining on the communications channel. In yet another example, the controller may calculate the Quality Drop Coefficients and the Quality Drop Values in response to determining that the capabilities of a session on the communications channel have been changed (e.g., enabling a feature in an endpoint or a communications device affecting its capabilities). In yet another example, the controller calculates the Quality Drop Coefficients and the Quality Drop Values in response to determining that the declared capabilities of the communications devices have changed (e.g., determining that the actual capabilities of a communications device are different from the declared or user-indicated capabilities of the communications device). In yet another example, the controller may calculate the Quality Drop Coefficients and the Quality Drop Values in response to determining that an additional channel has been opened, or closed, in an existing session (e.g., upgrading from a voice call to a voice and video call in the middle of the call). In yet another example, the controller may calculate the Quality Drop Coefficients and the Quality Drop Values in response to determining that the capabilities of the communications channel has changed (e.g., an increase in allocated bandwidth).

As described previously, in accordance with some embodiments of the present invention, the session border controller or any other suitable controller uses a weighted approach by calculating quality degradation and the number of sessions suffering the quality degradation. At step 308, upon determining the optimal media characteristics for the sessions on the communications channel, the controller sets the media characteristics for each session on the communications channel to match the optimal media characteristics.

As described previously, it should be noted that the Quality Drop Coefficient (QDC) and the Quality Drop Value (QDV) may be recalculated in response to any suitable event or at any suitable time.

Figure 4:
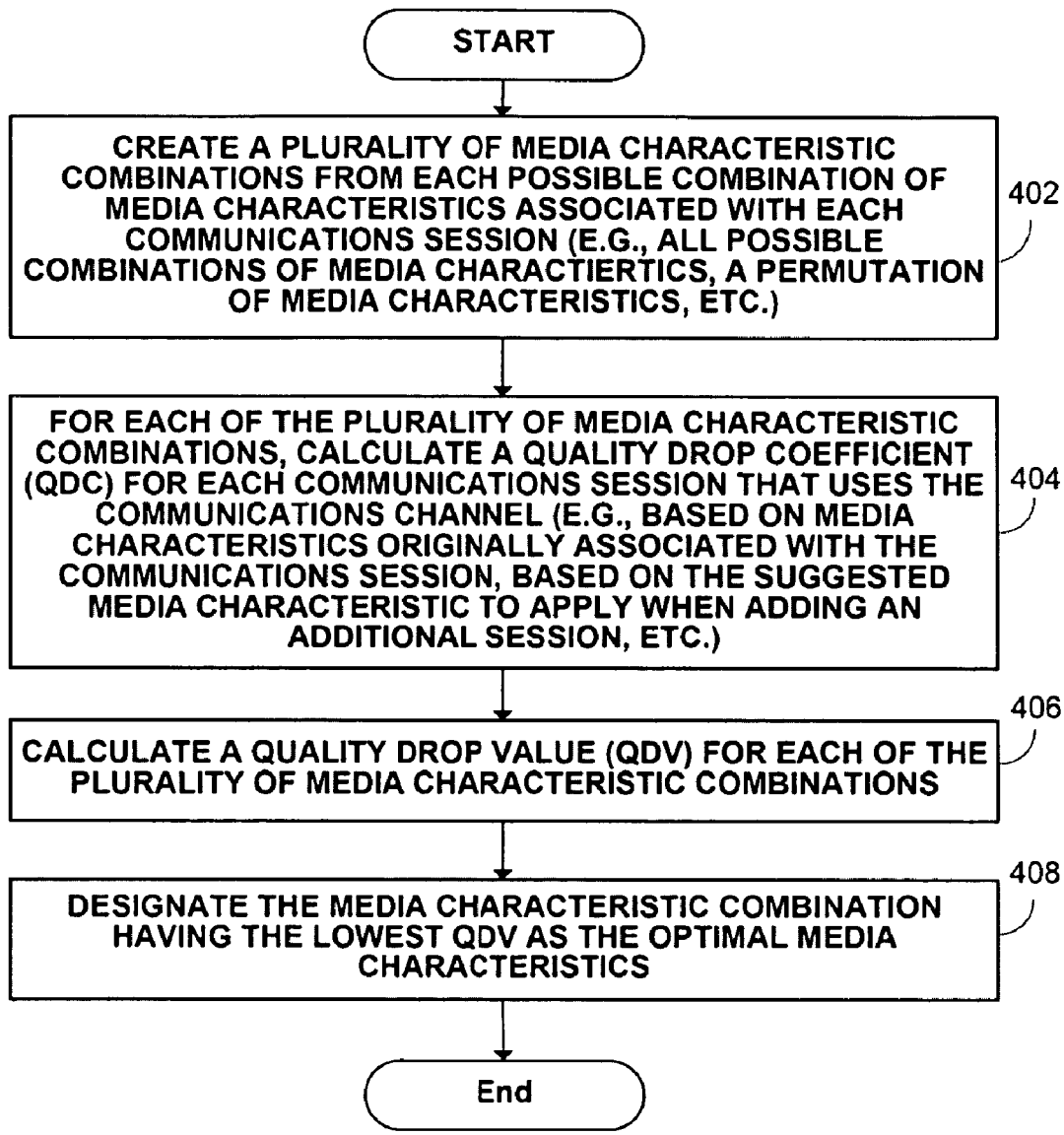

FIG. 4 shows a diagram of a process for calculating Quality Drop Coefficients (QDC) and Quality Drop Values (QDV) in accordance with some embodiments of the present invention. When a communications device (e.g., a VoIP phone) initiates a new session on the communications channel or any other suitable event is detected (e.g., change in the capabilities of one of the sessions, change in one of the sessions, etc.), the controller checks whether an intervention is necessary to ensure optimal media characteristics to the communications sessions using the communications channel. If the controller determines that such interventions are necessary, the controller determines the optimal media characteristics set and applies it on the sessions that are active on the communications channel. For example, when a communications device initiates a session and the controller determines that there is not sufficient bandwidth available to initiate the session, the controller determines the optimal media characteristics (e.g., the optimal bitrate, the optimal codec, the optimal payload size, the optimal packet size, the optimal frame rate, the optimal resolution, the optimal granularity, the optimal sampling rate, etc.) for each communications session and, as a result, for each communications device participating in one or more sessions on the communications channel.

It should be noted that, in some embodiments, the communications device that initiates the new session may have one or more default or suggested media characteristics. The controller may use the default or suggested media characteristics (e.g., a suggested bitrate, a suggested packet size, etc.) when determining the optimal media characteristics.

As shown at step 402, a plurality of media characteristics combinations are created. Each communications session, and, as a result, the communications devices that are part of this session, has media characteristics associated with it. For example, a particular VoIP session may have the following media characteristics: a G.711 codec, a bitrate of 64 Kbps, a payload size of 160 bytes, and transmits 50 packets per second. As shown in FIG. 2, the controller calculates the Quality Drop Values using Quality Drop Coefficients from a multi-dimensional matrix or table of the possible combinations of media characteristics. Similarly, the controller may access a matrix or table of Quality Drop Coefficients, where the matrix includes all possible combinations of one or more media characteristics. The vertical axis of the matrix defines the entry media characteristics of the communications session from the original session (which, in some embodiments, may denote the optimal media characteristics that the communications device can provide in this session) and the horizontal axis of the matrix defines the suggested media characteristics for this session. The intersection between the entry media characteristics and the output media characteristics is the Quality Drop Coefficient for the communications session. Again, the greater the difference between the entry media characteristics and the suggested media characteristics, the more significant the quality degradation for the session. The controller uses the matrix to calculate a Quality Drop Coefficient for each communications session that uses the communications channel (step 404).

In some embodiments, the Quality Drop Coefficient may be computed according to the second highest media characteristics between the sessions on the same communications channel, and the Quality Drop Value may be a function of each calculated Quality Drop Coefficient and the number of sessions suffering from each calculated Quality Drop Coefficient. These calculations determine the optimal media characteristics for each communications session.

Using the Quality Drop Coefficient, the controller then calculates a Quality Drop Value for each of the plurality of media characteristic combinations (step 406). For example, the controller may base the calculation of QDV on the equation: QDV=QDC1 (Quality Drop Coefficient 1)*(the number of sessions suffering QDC1)+QDC2*(the number of sessions suffering QDC2)+ . . . +QDCn*(the number of sessions suffering QDCn).

The controller designates the media characteristics set having the lowest Quality Drop Value as the optimal media characteristics (step 408). In some embodiments, the controller automatically configures each session with the optimal media characteristics. Alternatively, the controller transmits an instruction to each communications device participating in sessions on the communications channel to modify the media characteristics to match the optimal media characteristics.

As described previously, the controller may recalculate the Quality Drop Coefficients and the Quality Drop Values in response to any suitable event. For example, in response to receiving one or more requests to initiate new sessions, the controller recalculates Quality Drop Coefficients and Quality Drop Values to include the new sessions and their corresponding communications devices.

In some embodiments, the controller recalculates the Quality Drop Coefficients and the Quality Drop Values in response to determining that the amount of sessions on the communications channel has changed. For example, in response to determining that the number of VoIP sessions on the network has decreased from one hundred to fifty, the controller may recalculate the Quality Drop Coefficients and the Quality Drop Values as more bandwidth is available, thereby increasing call quality.

In some embodiments, the controller recalculates the Quality Drop Coefficients and the Quality Drop Values at any suitable time. For example, the controller may recalculate the Quality Drop Coefficients and the Quality Drop Values in response to determining that a communications device is joining or leaving a session. In another example, the controller may recalculate the Quality Drop Coefficients and the Quality Drop Values in response to determining that a session has been removed from the communications channel (e.g., allocating more bandwidth for sessions that are remaining on the communications channel. In yet another example, the controller may recalculate the Quality Drop Coefficients and the Quality Drop Values in response to determining that the capabilities of a session on the communications channel have been changed (e.g., enabling a feature in an endpoint or a communications device affecting its capabilities). In yet another example, the controller recalculates the Quality Drop Coefficients and the Quality Drop Values in response to determining that the declared capabilities of the communications devices have changed (e.g., determining that the actual capabilities of a communications device are different from the declared or user-indicated capabilities of the communications device). In yet another example, the controller may recalculate the Quality Drop Coefficients and the Quality Drop Values in response to determining that an additional channel has been opened in an existing session (e.g., upgrading from a voice call to a voice and video call in the middle of the call).

In some embodiments, the controller instructs a device on the communications path to perform the transformation of the media characteristics.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

Thus, it is seen that devices, methods, and media for determining and assigning optimal media characteristics in communications sessions are provided. One skilled in the art will appreciate that the invention can be practiced by other than the described embodiments, which are presented for purposes of illustration and not of limitation, that various features of the described embodiments can be interchanged and used in any suitable combination, and that the present invention is limited only by the claims which follow.

What is claimed is:

1. A method for dynamically allocating bandwidth in communications systems, the method comprising:

managing one or more sessions between a plurality of communications devices on a communications channel, wherein media characteristics are associated with each session, the media characteristics comprising at least one of: a codec, a bitrate, a resolution, a maximum granularity for video streams, a sampling rate for audio streams, a frame rate, and a packet size, and wherein each session has original media characteristics;

detecting at least one of: a change in one of the sessions on the communications channel, an addition of an additional session on the communications channel, a removal of one of the sessions from the communications channel, a change in capabilities of one of the sessions on the communications channel, a change in capabilities of the communications channel, and a change in capabilities of one of the plurality of communications devices;

in response to the detection, determining alternate media characteristics to be used by the one or more sessions on the communications channel, wherein the determination comprises:

creating a plurality of media characteristic combinations from every possible combination of the media characteristics associated with the one or more sessions;

for each of the plurality of media characteristic combinations, calculating a Quality Drop Coefficient (QDC) for each session that uses the communications channel, wherein the QDC is computed based at least in part on the original media characteristics associated with each session and suggested media characteristics to apply in response to the detection; and calculating a Quality Drop Value (QDV) for each of the plurality of media characteristic combinations from each calculated QDC weighted by a number of affected sessions, wherein the media characteristic combination having the lowest QDV is designated as the alternate media characteristics; and setting the media characteristics associated with each session on the communications channel to the alternate media characteristics.

2. The method of claim 1, wherein the detecting the change in the one or more sessions on the communications channel includes at least one of: receiving an indication that one of the plurality of communications devices has joined one of the sessions and receiving an indication that one of the plurality of communications devices has left one of the sessions.

3. The method of claim 1, wherein the detecting the change in the capabilities of one of the sessions includes receiving an indication that a feature in one of the plurality of communications devices has been enabled or disabled.

4. The method of claim 1, wherein the detecting the change in the capabilities of one of the plurality of communications devices includes receiving an indication that actual capabilities of that communications device are different from declared capabilities of that communications device.

5. The method of claim 1, further comprising recalculating the QDC and QDV in response to receiving another request to initiate a session on the communications channel.

6. The method of claim 1, further comprising recalculating the QDC and QDV in response to determining that at least one of: the communications device has joined one of the sessions, the communications device has left one of the sessions, and the amount of sessions on the communications channel has changed.

7. The method of claim 1, further comprising recalculating the QDC and QDV in response to determining that the declared capability of the communications devices that are participating in one of the sessions on the communications channel has changed.

8. The method of claim 1, wherein the QDV is calculated starting from the second highest media characteristics and reduced consecutively to each of the next lower media characteristics until predetermined media characteristics above the lowest media characteristics of the one or more sessions on the communications channel is reached.

9. The method of claim 1, wherein the QDV is calculated according to each calculated QDC and the number of sessions suffering from each calculated QDC.

10. The method of claim 1, wherein the additional session is rejected due to a lack of resources in response to one of failing to find the QDV that complies with a service level agreement (SLA) and failing to find the QDV that can run on the communications channel.

11. A system for dynamically allocating bandwidth, the system comprising:

a processor that is configured to:
manage one or more sessions between a plurality of communications devices on a communications channel, wherein media characteristics are associated with each session, the media characteristics comprising at least one of a codec, a bitrate, a resolution, a maximum granularity for video streams, a sampling rate for audio streams, a frame rate, and a packet size, and wherein each session has original media characteristics;

detect at least one of a change in one of the sessions on the communications channel, an addition of an additional session on the communications channel, a removal of one of the sessions from the communications channel, a change in capabilities of one of the sessions on the communications channel, a change in capabilities of the communications channel, and a change in capabilities of one of the plurality of communications devices;

in response to the detection, determine alternate media characteristics to be used by the one or more sessions on the communications channel, wherein the processor is further configured to:
create a plurality of media characteristic combinations from every possible combination of the media characteristics associated with the one or more sessions;

for each of the plurality of media characteristic combinations, calculating a Quality Drop Coefficient (QDC) for each session that uses the communications channel, wherein the QDC is computed based at least in part on the original media characteristics associated with each session and suggested media characteristics to apply in response to the detection; and calculate a Quality Drop Value (QDV) for each of the plurality of media characteristic combinations from each calculated QDC weighted by a number of affected sessions, wherein the media characteristic combination having the lowest QDV is designated as the alternate media characteristic; and set the media characteristics associated with each session on the communications channel to the alternate media characteristics.

12. The system of claim 11, wherein the processor is a portion of one of: a session border controller and a device on the network that is capable of modifying the media characteristics associated with each of the plurality of communications devices.

13. The system of claim 11 wherein each communications devices is one of: a voice over IP (VoIP) phone, a Session Initiation Protocol (SIP) phone, a software program for making telephone calls over the communications path on a computer, a Skype phone, and a communications server.

14. The system of claim 11, wherein the processor is further configured to detect the change in one of the sessions on the communications channel by receiving an indication that one of the plurality of communications devices has joined one of the sessions or receiving an indication that one of the plurality of communications devices has left one of the sessions.

15. The system of claim 11, wherein the processor is further configured to detect the change in the capabilities of one of the sessions by receiving an indication that a feature in one of the plurality of communications devices has been enabled or disabled.

16. The system of claim 11, wherein the processor is further configured to detect the change in the capabilities of one of the plurality of communications devices by receiving an indication that actual capabilities of that communications device are different from declared capabilities of that communications device.

17. The system of claim 11, wherein the processor is further configured to recalculate the QDC and QDV in response to receiving another request to initiate a session on the communications channel.

18. The system of claim 11, wherein the processor is further configured to recalculate the QDC and QDV in response to determining that at least one of: the communications device has joined a session, the communications device has left the session, and the amount of sessions on the communications channel has changed.

19. The system of claim 11, wherein the processor is further configured to recalculate the QDC and QDV in response to determining that the declared capability of the communications devices that are participating in one of the sessions on the communications channel has changed.

20. The system of claim 11, wherein the processor is further configured to calculate the QDV by starting from the second highest media characteristics and reducing consecutively to each of the next lower media characteristics until predetermined media characteristics above the lowest media characteristics of the one or more sessions on the communications channel is reached.

21. The system of claim 11, wherein the processor is further configured to calculate the QDV according to each calculated QDC and the number of sessions suffering from each calculated QDC.

22. The system of claim 11, wherein the additional session is rejected due to a lack of resources in response to one of: failing to find the QDV that complies with a service level agreement (SLA) and failing to find the QDV that can run on the communications channel.

23. A non-transitory computer-readable medium containing computer-executable instructions that, when executed by a processor, cause the processor to perform a method for dynamically allocating bandwidth in communications systems, the method comprising:

managing one or more sessions between a plurality of communications devices on a communications channel, wherein media characteristics are associated with each session, the media characteristics comprising at least one of: a codec, a bitrate, a resolution, a maximum granularity for video streams, a sampling rate for audio streams, a frame rate, and a packet size, and wherein each session has original media characteristics;

detecting at least one of: a change in one of the sessions on the communications channel, an addition of an additional session on the communications channel, a removal of one of the sessions from the communications channel, a change in capabilities of one of the sessions on the communications channel, a change in capabilities of the communications channel, and a change in capabilities of one of the plurality of communications devices;

in response to the detection, determining alternate media characteristics to be used by the one or more sessions on the communications channel, wherein the determination comprises:

creating a plurality of media characteristic combinations from every possible combination of the media characteristics associated with the one or more sessions;

for each of the plurality of media characteristic combinations, calculating a Quality Drop Coefficient (QDC) for each session that uses the communications channel, wherein the QDC is computed based at least in part on the original media characteristics associated with each session and suggested media characteristics to apply in response to the detection; and calculating a Quality Drop Value (QDV) for each of the plurality of media characteristic combinations from each calculated QDC weighted by a number of affected sessions, wherein the media characteristic combination having the lowest QDV is designated as the alternate media characteristics; and setting the media characteristics associated with each session on the communications channel to the alternate media characteristics.

24. The non-transitory computer-readable medium of claim 23, wherein the detecting the change in one of the sessions on the communications channel includes at least one of: receiving an indication that one of the plurality of communications devices has joined one of the sessions and receiving an indication that one of the plurality of communications devices has left one of the sessions.

25. The non-transitory computer-readable medium of claim 23, wherein the detecting the change in the capabilities of one of the sessions includes receiving an indication that a feature in one of the plurality of communications devices has been enabled or disabled.

26. The non-transitory computer-readable medium of claim 23, wherein the detecting the change in the capabilities of one of the plurality of communications devices includes receiving an indication that actual capabilities of that communications device are different from declared capabilities of that communications device.

27. The non-transitory computer-readable medium of claim 23, wherein the method further comprises recalculating the QDC and QDV in response to receiving another request to initiate a session on the communications channel.

28. The non-transitory computer-readable medium of claim 23, wherein the method further comprises recalculating the QDC and QDV in response to determining that at least one of: the communications device has joined a session, the communications device has left the session, the amount of sessions on the communications channel has changed, and an additional communications channel has been opened.

29. The non-transitory computer-readable medium of claim 23, wherein the method further comprises recalculating the QDC and QDV in response to determining that the declared capability of the communications devices that are participating in one of the sessions on the communications channel has changed.

30. The non-transitory computer-readable medium of claim 23, wherein the QDV is calculated starting from the second highest media characteristics and reduced consecutively to each of the next lower media characteristics until predetermined media characteristics above the lowest media characteristics of the one or more sessions on the communications channel is reached.

31. The non-transitory computer-readable medium of claim 23, wherein the QDV is calculated according to each calculated QDC and the number of sessions suffering from each calculated QDC.

32. The non-transitory computer-readable medium of claim 23, wherein the additional session is rejected due to a lack of resources in response to one of: failing to find the QDV that complies with a service level agreement (SLA) and failing to find the QDV that can run on the communications channel.

* * * * *